June 17, 1969  K. R. JONES ET AL  3,449,820
METHOD OF MANUFACTURING BATTERY ASSEMBLIES
Filed March 17, 1964
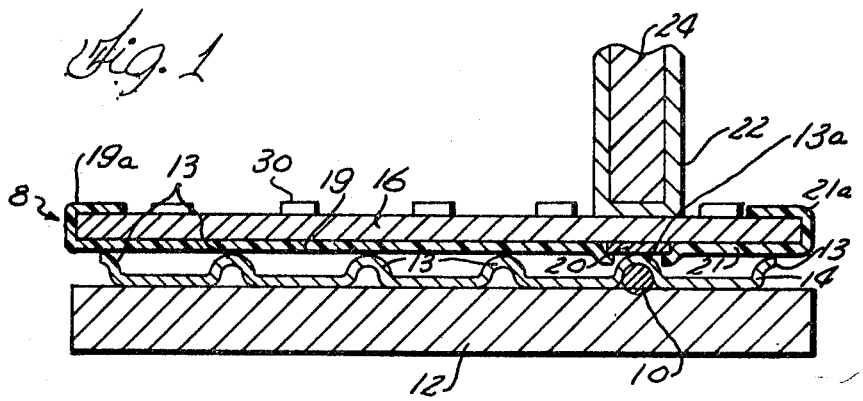
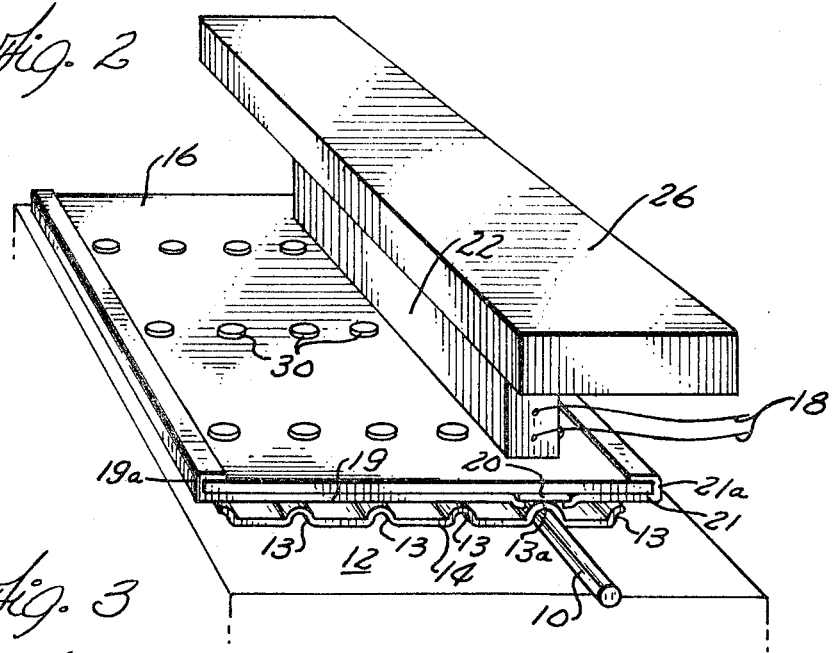
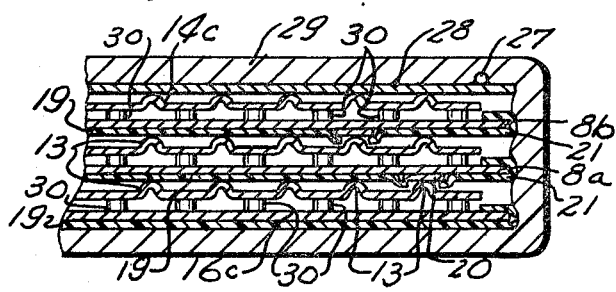
INVENTOR.
Kenneth R. Jones
BY John R. Thomas
Pendleton, Neuman,
Seibold & Williams
Attorneys United States Patent Office 3,449,820
Patented June 17, 1969

3,449,820
METHOD OF MANUFACTURING
BATTERY ASSEMBLIES
Kenneth R. Jones, Mequon, and John R. Thomas, Whitefish Bay, Wis., assignors to Globe-Union Inc., Milwaukee, Wis., a corporation of Delaware
Filed Mar. 17, 1964, Ser. No. 352,595
Int. Cl. B23k 19/00; F16b 11/00; H01m 1/00
U.S. Cl. 29—472.9           15 Claims

ABSTRACT OF THE DISCLOSURE

In a battery of the type having a silver chloride member and a connecting member with a silver surface juxtaposed with the silver chloride member, the silver surface and the silver chloride member are welded together by pressing the members into contact with each other and heating the junction of the members to 450° F. to 600° F.

---

This invention relates to improved battery assemblies and an improved method for producing such battery assemblies. More particularly, this invention relates to batteries of the type having a silver chloride electrode or electrodes of similar physical characteristics and a method of manufacture thereof.

One type of battery in wide use today is the sea water activated primary battery wherein the battery enclosure is open to the ingress and egress of sea water, which acts as the electrolyte, and the electrodes comprise a magnesium anode and a silver chloride cathode. The silver chloride cathode has preferably been reduced slightly on its surfaces to render them conductive, and the anode and cathode of each respective cell are spaced apart a small, controlled distance for the accommodation of electrolyte. Separators or partitions, comprising a least in part non-corroding, conductive metal foil, such as silver foil or a silver plated foil of a base metal, extend between adjacent cells to provide isolation of the electrolyte in the various cells and to prevent intercell reactions while at the same time providing an electrical connection between the cathode of one cell and the anode of the adjacent cell.

The most conventional method of assembling such batteries has been to collect or collate anodes, spacers, cathodes, and partitions in the proper number and order and to tape or otherwise secure this assembly together with some binding pressure to maintain the relative positions of the elements. There after, the entire assembly is usually mounted within a protective housing which carries terminal connections for the unit.

In one improved form and method of assembly as set forth in pending United States patent application Ser. No. 579,171, filed by Jones et al. on Sept. 13, 1966, a continuation of United States application Ser. No. 287,171 filed by Jones et al. on May 29, 1963 (now abandoned) and assigned to the same assignee as the instant application, subassemblies of an anode having adhesively secured spacers, a partition, and a cathode of the next adjacent cell are preliminarily formed and the requisite number of these subassemblies, with appropriate terminal electrodes, are assembled to form a complete battery which is then encased. In the latter improved construction, a small amount of a cement or adhesive was used to maintain the subassembly while being handled and assembled into the complete battery. In addition to the difficulty of handling the many components or the complexity of using an adhesive, the prior art constructions exhibited varying degrees of electrical degradation with use. In using the conventional sea water activated battery, the magnesium anode is consumed and the silver chloride cathode is reduced and rendered spongy and soft. As a result of these actions the internal resistance of some prior art batteries rose significantly probably in part due to an insufficient contact pressure between the various battery elements.

In one embodiment of the present invention, the prior art is improved upon by welding the silver chloride electrode to a conductive metal foil portion of the partition. By the use of the present invention, the connection between the cathode and the partition is not affected by changes in the nature and form of the cathode during the discharge of the battery. In addition, the welded connection provided by the present invention is strong enough to obviate the need for cementing the cathode to the partition in making up the electrode assembly and thus simplifies handling a multitude of individual components, thereby resulting in reduced cost and simplified manufacture, in addition, the welded connection of the present invention substantially retains its low initial resistance permanently, and is not adversely affected by storage for long periods prior to use or by the physical changes in the battery during use.

Accordingly, one principal object of the present invention is to provide an improved electrode assembly, and a method of making the same, in which a rigid and permanent connection is effected between the cathode and the cell partition.

A further object of the present invention is to provide an improved electrode assembly, and a method of making the same, in which an optimum electrical connection is provided between the cathode and the partition, which is not subject to change during the time the battery is stored or during the time it is being used.

These and other objects and advantages of the present invention will become manifest by examination of this description and the accompanying claims and drawing.

Reference will now be made to the accompanying drawing, in which:

FIGURE 1 is a vertical cross-sectional illustration of a battery subassembly in association with apparatus used in construction such an electrode assembly in accordance with the present invention.

FIG. 2 is a perspective view of the apparatus of FIG. 1.

FIG. 3 is a fragmentary cross-sectional view of a completed battery constructed in accordance with this invention.

Referring now to FIG. 1, there is illustrated an electrode assembly 8 of a battery including a cathode 14, an anode 16, and and an intervening partition which in combination comprises a sheet of insulating material 19, a non-corroding, conductive metal foil strip 20, and a second sheet of insulating material 21. The cathode 14 is supported on an anvil 10 comprising an elongate member of circular cross section which is in turn supported on a base 12. The anvil 10 engages the concave surface of one of a plurality of longitudinal channels 13 formed in the cathode 14. While the instant embodiment describes a cathode 14 having a longitudinal channel 13 which has several significant advantages in the manufacture and overall operation of the resulting battery, it will be apparent that other protuberant portions such as small semi-spherical nubs may be employed to advantage. Furthermore, in some instances a flat cathode may be employed, selected portions of which are welded to the non-corroding, conductive, metal foil 20. The use of protuberances facilitates welding and provides a space between the cathode and partition for electrolyte generally resulting in improved battery operation and thermal characteristics. The use of longitudinal channels as the protuberances further facilitates welding and manufacture and also results in augmented electrolyte movement in the resulting battery.

The illustrated anvil 10 is of substantially the same diameter as the internal diameter of grooves or channels 13.

The concave surface does not necessarily have a circular configuration. The only desideratum is that the anvil 10 has a complementary configuration to form the desired contact with the grooves or channels 13. The preferred embodiment, however, facilitates assembly in that it maintains the most remote portion of the channel in contact with the non-corroding, conductive metal foil strip without compressing or deforming the remainder of the cathode, a smaller diameter or a different shape may be employed provided the line contact with the bight of the channel is maintained. The partition comprises a sheet of insulating material 19 which overlies a major surface portion of the anode 16 facing the cathode 14, a conductive strip 20 in engagement with the anode 16 and a second sheet of insulating material 21. The conductive strip is preferably formed of silver foil, and is welded to the anode 16 by conventional techniques such as resistance welding. The insulating sheets 19 and 21 are of any sufficiently flexible, thin, water-impervious plastic material capable of being secured to the magnesium anode 16 and the silver surface of the conductor 20. In the preferred form of the battery, the insulating material is coated with a pressure-sensitive adhesive which forms seals with both the anode and the edges of the strip 20. Adhesively coated polyethylene terephthalate resin (Mylar) has been found satisfactory for this use. The sheets 19 and 21 are preferably formed about the edges of the anode 16 to provide edge bindings 19a and 21a respectively.

A pressure bar 22 is brought into engagement with the top of the anode 16 by means not shown, and is provided with a heating element 24 by which the temperature of the pressure bar may be raised. The heating element 24 is preferably electrically energized, as schematically indicated by leads 18. The electrode assembly may be compressed between the pressure bar 22 and the anvil 10. For greater temperature stability in operation, the entire arm 26 supporting the pressure bar 22 may be maintained at the welding temperature. A separate heating element may be disposed in arm 26 for this purpose, or in some instances, the heating element in arm 26 may provide the entire heat source for both arm 26 and pressure bar 22.

The anode 16 is preferably formed of magnesium which is an excellent heat conductor, whereby the heat generated by the heating element 24 is passed through the pressure bar 22, and thence through the magnesium anode 16 and the silver conductive strip 20 to the junction between the strip 20 and a selected protuberance 13a of the cathode 14.

The cathode 14 is formed of silver chloride, the surfaces of which preferably have been partially reduced to provide initial conduction when the battery is placed in operation. Silver chloride has a melting point of approximately 851° F. The softening or plastic point of the silver chloride is not clearly defined because this composition has only a single phase structure. However, it has been found that raising the temperature to approximately 450° F. to 600° F. while applying a pressure to the pressure bar 22, causes the cathode 14 and the conductive strip 20 to be welded or bonded together to form a substantial mechanical and electrical connection. While the exact mechanism of welding in this invention has not been completely explained, a joint is not formed between the two pieces of silver under the given conditions of temperature and pressure and thus the weld appears to result from action of the silver chloride through the reduced silver surface.

It has been found that a force of about 13 to 25 pounds per inch of length of the line of contact between the cathode 14 and the silver strip 20 is sufficient to form a good bond. The pressure serves to maintain the two parts to be joined in intimate contact along their line of contact and this must be appropriately adjusted for flat cathodes or for other protuberance configurations. Any nonflatness is eliminated and the horny silver chloride is deformed with a force of 13 to 25 pounds per inch, and no significant improvement of the weld is realized by subjecting the parts to higher pressures. The unit pressure operating on the line junction between the cathode 14 and the silver surface strip 20 is much higher than that applied to the relatively larger upper surface of the pressure bar 22, because the cathode 14 touches the strip 20 along substantially a straight line. The contact line has some width due to the deformation of the silver strip 20 and the silver chloride cathode 14, but has a relatively small area. It is this enhanced unit pressure in combination with the elevated temperature of the junction which causes the silver strip and the partially reduced silver chloride to be welded together.

The period of time during which the temperature and pressure must be applied is related to the temperature of the pressure bar 22, and the physical dimensions of the parts involved. If the parts are relatively thick, for example, more time is required to heat the junction between the cathode 14 and the silver strip 20; but the exact time cycle for any particular set of parts is easily determined, the force and temperature requirement remaining within the limits previously described.

Referring now to FIG. 2, the method of the present invention is illustrated in perspective, as an arm 26 forces the pressure bar 22 into its position against the anode 16. The surface of the anode which faces away from the cathode 14 is provided with a multiplicity of pieces of thin insulating material 30 which are adapted to space the anode and cathode of a given cell from each other when the parts are assembled later into a complete battery, as disclosed and claimed in said copending Jones et al. application Ser. No. 287,171.

It has been found that the sizes of electrode material customarily used in deferred action batteries are eminently suitable for the performance of the process of the present invention. The process has been successfully used on silver chloride cathodes having thicknesses between .012″ and .067″, and magnesium anodes having thicknesses between .010″ and .035″, with the conductive strip 20 being a strip of silver foil of about .001″ thickness. In each case, the junction was welded by the application of heat for an interval within the range of ¾ to 10 seconds, when the pressure bar 22 was heated to 450° F. to 600° F; the face area of the anode 16 was 2.8 to 11.0 square inches, and that of the cathode 14 was 1.6 to 8.6 square inches.

The manner in which the battery electrode assemblies are formed into a completed battery is illustrated in FIG. 3. The electrode asemblies 8a, 8b, etc., the number depending upon the voltage requirements, are maintained in a jig with appropriate terminal connections 27, only one of which is shown, and a terminal plate 28. The entire assembly is submerged into a compound which forms an appropriate housing 29, as described in detail in said Jones et al. application. In a preferred form of the invention, the terminal plate 28, which is silver or silver coated, is welded to the cathode 14c in acordance with the herein described method. The terminal anode 16c may be connected directly to a terminal wire through a narrow silver strip as described above, or a separate terminal plate, like terminal plate 28 may be added.

Such terminal plates are customarily formed of copper or steel to give added physical strength to the battery assembly. The copper or steel terminal plate is preferably first coated with a silver surface, either by electroplating or by attaching a strip of silver foil to the terminal plate by conventional techniques. The silver chloride cathode may then be welded to the silver coating by the method of the present invention. It will be readily apparent that the time required to effect the weld between the cathode and the terminal plate may be longer than when a magnesium anode is used because the terminal plates are generally thicker than the anodes, and the metal from which they are made has a higher heat capacity than magnesium. In one example, a silver chloride cathode 1.6 square inches by .018 inch thick was welded in 12 seconds to a 2.8 square inch silver plated copper end plate which was 0.15 inch thick. In another example, an 8.6 square inch cathode 0.23 inch thick was welded in 12 seconds to a .001 inch strip of silver foil mounted on an 11 square inch steel end plate which was .014 inch thick. In both cases, the temperature of the pressure bar 22 was 450° F.

From the foregoing, the present invention has been sufficiently described to enable others skilled in the art, by applying current knowledge, to make and use the same, under varying conditions of service, without departing from the essential items of novelty involved, which are intended to be defined and secured by the appending claims.

What is claimed is:

1. A method of welding a silver chloride member to a member having a silver surface, comprising pressing said silver chloride member into contact with said silver surface, and heating the junction of said members to about 450° F. to 600° F.

2. The method according to claim 1, wherein said members are relatively flat, sheet-like members.

3. A method of forming a battery electrode assembly including a silver chloride cathode having a partially reduced surface and a metallic connecting member having a silver surface, said method comprising the steps of pressing the partially reduced surface of said cathode and said silver surface of the connecting member together and heating the junction of said cathode and said connecting member to about 450° F. to 600° F. to form a bond between said cathode and said member.

4. The method according to claim 3, wherein said junction is heated by applying heat to the side of said connecting member remote from said junction, said applied heat flowing through said member to said junction.

5. A method of forming a battery electrode assembly including a silver chloride cathode having a partially reduced surface and a metallic connecting member having a silver surface comprising the steps of forming a protuberance on said surface of the cathode, juxtaposing said protuberance and the silver surface of said member to form a junction, applying pressure between said protuberance and said member, and heating said junction to approximately 450–600° F. to form a bond between said cathode and said member.

6. The method according to claim 5, wherein said junction is heated by applying heat to the side of said member remote from said junction, said applied heat flowing through said member to said junction.

7. The method according to claim 5, wherein said protuberance is formed as an elongate ridge to form substantially a line contact with said member when juxtaposed therewith.

8. The method according to claim 7, wherein said pressure is about 13 to 25 pounds per inch of length of said protuberance.

9. In a method of assembling a multicell battery including a plurality of cells each having a silver chloride cathode having a partialy reduced surface and a magnesium anode, said cells being separated from one another by a partition including a metallic member having a silver surface, said method comprising placing a cathode, a partition and an anode in stacked relationship with the reduced and silver surfaces juxtaposed to form a subassembly, forcing a member heated to approximately 450– 600° F. into contact with said anode, thereby pressing said anode, partition and cathode against each other, whereby the junction of said reduced surface and said silver surface is heated to approximately 450–600° F. by heat conducted from said heated element through said anode to fuse said cathode to said partition.

10. In a method of assembling a multicell battery including a plurality of cells each having a silver chloride cathode having a partially reduced surface and a magnesium anode, said cells being separated from one another by a partition having a silver surface portion, said method comprising placing a cathode, a partition and an anode in stacked relationship with the reduced and silver surfaces juxtaposed to form a subassembly, securing the anode to the partition, forcing a member heated to approximately 450–600° F. into contact with said anode, thereby pressing said anode, silver surface portion and cathode reduced surface against each other, whereby the junction of said cathode and said metallic surface portion is heated to approximately 450–600° F. by heat conducted from said heated element through said anode to fuse said cathode to said metallic surface portion.

11. The method according to claim 1, wherein one of said members is formed with a protuberance adapted to be pressed into contact with the other of said members.

12. The method according to claim 11, wherein the pressure is about 13 to 25 pounds per inch of length of said protuberance.

13. A method of forming a battery electrode assembly including a sheet-like silver chloride cathode member having a partially reduced surface and a silver surfaced connecting member adapted to contact said reduced surface comprising the steps of forming a protuberance in said sheet like member, juxtaposing one side of said protuberance and the silver surface of the other of said members, juxtaposing the opposite side of said protuberance with a complementary shaped member, applying pressure between said complementary shaped member and said connecting member, and heating said protuberance to approximately 450–600° F., at which a bond is formed between said cathode member and connecting member.

14. The method according to claim 13, wherein said protuberance is formed as an elongated ridge to form substantially a line contact between said members when juxtaposed.

15. The method according to claim 14, wherein said pressure is about 13 to 25 pounds per inch of length of said protuberance.

References Cited

UNITED STATES PATENTS

| | | | |
|---|---|---|---|
| 2,454,462 | 11/1948 | Kremers | 29—504 X |
| 2,753,623 | 7/1956 | Boessenkool | 29—497.5 |
| 3,154,847 | 11/1964 | Chapman | 29—494 |
| 3,306,775 | 2/1967 | Burant | 136—143 X |
| 2,831,046 | 4/1958 | Linton | 136—175 |
| 2,931,849 | 4/1960 | Burrell | 136—175 |
| 2,900,432 | 8/1959 | Broglio | 136—90 |
| 3,102,058 | 8/1963 | Jones | 136—90 |

JOHN F. CAMPBELL, *Primary Examiner.*

R. F. DROPKIN, *Assistant Examiner.*

U.S. Cl. X.R.

29—195, 482, 497.5, 498, 504; 136—175; 287—189.365